(12) United States Patent
Sourour et al.

(10) Patent No.: US 6,891,883 B2
(45) Date of Patent: May 10, 2005

(54) DELAY SEARCHER AND DELAY TRACKERS INTERACTION FOR NEW DELAYS ASSIGNMENT TO RAKE FINGERS

(75) Inventors: Essam Sourour, Cary, NC (US); Gregory E. Bottomley, Cary, NC (US); Rajaram Ramesh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 5 days.

(21) Appl. No.: 10/365,857

(22) Filed: Feb. 13, 2003

(65) Prior Publication Data

US 2003/0128745 A1 Jul. 10, 2003

Related U.S. Application Data

(62) Division of application No. 09/168,233, filed on Oct. 7, 1998, now Pat. No. 6,560,273.

(51) Int. Cl.[7] .............................................. H04B 1/707
(52) U.S. Cl. ........................ 375/148; 375/147; 370/342
(58) Field of Search ................................. 375/140, 144, 375/147, 148; 370/320, 335, 342

(56) References Cited

U.S. PATENT DOCUMENTS

| | | | | |
|---|---|---|---|---|
| 6,134,260 A | * | 10/2000 | Bottomley et al. | 375/130 |
| 6,157,820 A | * | 12/2000 | Sourour et al. | 455/226.2 |
| 6,212,398 B1 | * | 4/2001 | Roberts et al. | 455/502 |
| 6,330,271 B1 | * | 12/2001 | Klang et al. | 375/134 |
| 6,345,078 B1 | * | 2/2002 | Basso | 375/349 |
| 6,381,229 B1 | * | 4/2002 | Narvinger et al. | 370/328 |
| 6,590,886 B1 | * | 7/2003 | Easton et al. | 370/342 |
| 6,643,275 B1 | * | 11/2003 | Gustafsson et al. | 370/328 |
| 2003/0235238 A1 | * | 12/2003 | Schelm et al. | |

FOREIGN PATENT DOCUMENTS

| | | |
|---|---|---|
| EP | 0877493 | 11/1998 |
| JP | A-9-181704 | 7/1997 |
| JP | A-9-326727 | 12/1997 |
| JP | A-10-173629 | 6/1998 |
| WO | WO 9935763 | 7/1999 |
| WO | WO 0021201 | 4/2000 |

* cited by examiner

*Primary Examiner*—Young T. Tse
(74) *Attorney, Agent, or Firm*—Coats & Bennett P.L.L.C.

(57) ABSTRACT

A direct sequence spread spectrum receiver for operating in a multipath fading channel comprises a rake receiver having plural rake fingers. Each rake finger demodulates a received signal from one of plural channel paths. The output of the plural rake fingers are combined. Each rake finger utilizes a select assigned delay to synchronize to a delay of the one channel path. A searcher periodically performs a channel search on the received signal to detect new delays of strongest paths in the channel. Plural trackers, one for each channel path, adjust the select assigned delays between searches performed by the searcher. A delay controller is operatively coupled to the searcher and the trackers. The delay controller compares new delays of the strongest paths from the searcher to the select assigned delays and reassigns one of the select assigned delays with one of the new delays only if the new delay differs from the one select assigned delay more than a predetermined threshold.

10 Claims, 3 Drawing Sheets

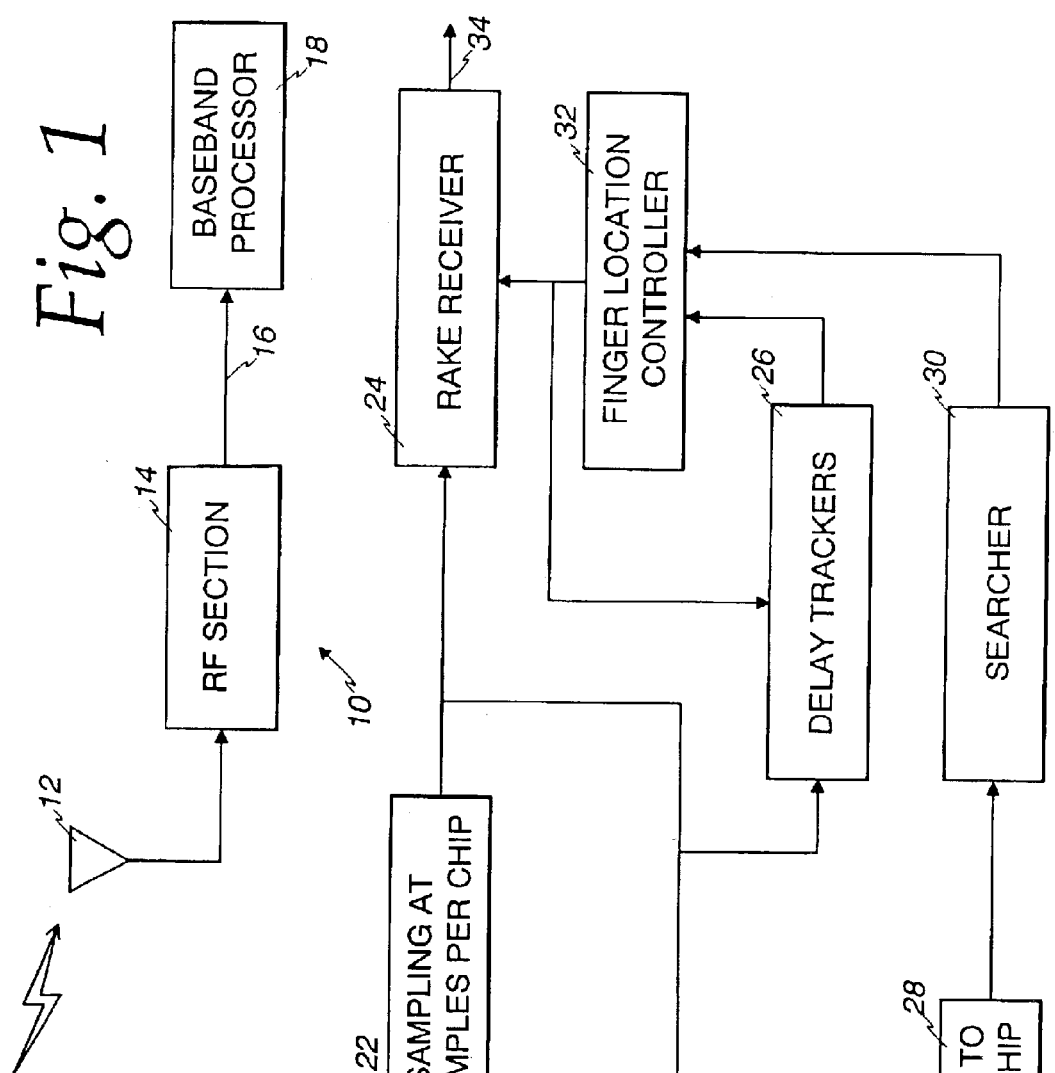

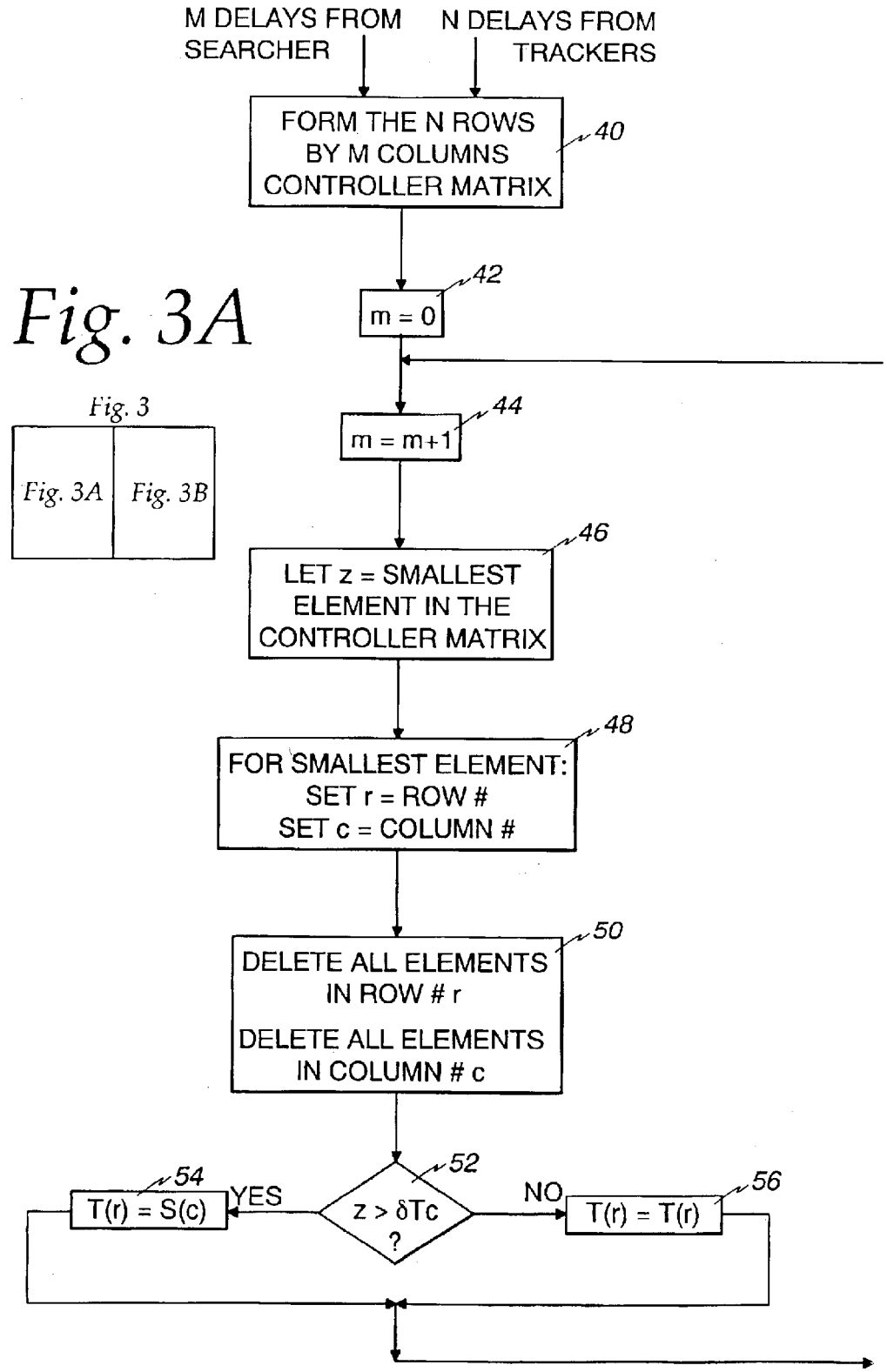

DELAY SEARCHER AND DELAY TRACKERS INTERACTION FOR NEW DELAYS ASSIGNMENT TO RAKE FINGERS

REFERENCE TO CO-PENDING APPLICATION

This application is divisional of U.S. patent Ser. No. 09/168,233 filed 7 Oct. 1998 U.S. Pat. No. 6,560,273 issued 6 May 2003 in the name of E. Sourour, G. Bottomley, and R. Ramesh, and entitled "Delay Searcher and Delay Trackers interaction for New Delays Assignment to Rake Fingers," which application is hereby incorporated herein by reference in its entirety.

FIELD OF THE INVENTION

This invention relates to direct sequence spread spectrum receivers and, more particularly, interaction between delay searcher and delay trackers for new delay assignment to a rake receiver.

BACKGROUND OF THE INVENTION

In a typical RF communication system, a transmittal signal may travel from a transmitter to a receiver over multiple paths, for example a direct path and also a reflected path. Each path may be considered a separate channel which is subject to the effects of fading, dispersion, etc. Moreover, the combination of signals at the receiver can result in additional fading. Such operating environments are known as multipath fading environments. Direct sequence spread spectrum (DS-SS) receivers can operate in multipath fading environments. A DS-SS receiver typically includes a rake receiver, which demodulates a received signal using plural demodulation "fingers", often referred to as rake fingers. Each rake finger demodulates the component signal from a number of the channel paths (such component signal referred to as a multipath component). The outputs of the rake fingers are combined for improved performance.

With multipath channels, a transmitted signal arrives in components, with each component having a different delay. The components can be distinguished and resolved if the delays are of sufficient duration. However, in order to demodulate the signals, the rake receiver must know the delay of each channel path.

Typically, a rake receiver operates in conjunction with a delay searcher and a delay tracker. The delay searcher analyzes a received signal and finds the delays. These delays are assigned to the rake fingers. However, in mobile telecommunications the channels may be subject to additional fading due to the motion of the receiver. A delay tracker tracks the delays assigned by the searcher between channel searches. Thus, while the searcher looks over a wide range of delays, the trackers look over a smaller range surrounding the assigned delays.

With such a configuration, problems may result during reassignment after a new search. One problem relates to loss of accuracy after the new search. Typically, a delay searcher uses less resolution than a delay tracker. When a new search is performed, the delay searcher may find a path with a delay that is close, but not exactly the same as that being tracked by the tracker. The path may actually be the same being tracked by the delay tracker. The difference in sensed delay is due to the lesser resolution of the delay searcher. Nevertheless, the delay searcher would assign the new delay to the rake finger, resulting in loss of accuracy until such time as the tracker subsequently adjusts the new delay.

Another problem relates to unnecessary relocation of rake finger delays. Typically, a delay searcher will assign a delay associated with the earliest arriving channel path to the first rake finger. Likewise, the next arriving channel path is assigned to the next rake finger, and so on. Due to fluctuation in relative signal strength of the changing channel paths, this can cause the same channel path to be reassigned to a different rake finger after subsequent searches. This reassignment takes time, and data may be lost during reassignment of the same channel path to a different rake finger.

The present invention is directed to overcoming one or more of the problems discussed above in a novel and simple manner.

SUMMARY OF THE INVENTION

In accordance with the invention there is disclosed an apparatus and method using delay searcher and delay tracker interaction for new delay assignment to a rake receiver.

Broadly, there is disclosed herein a direct sequence spread spectrum receiver for operating in a multipath fading environment comprising a rake receiver having plural rake fingers. Each rake finger demodulates a received signal component from one of plural channel paths (i.e., a multipath component). The outputs of the plural rake fingers are combined. Each rake finger utilizes a select assigned delay to synchronize to a delay of the channel path to which it is assigned. A Searcher periodically performs a channel search on the received signal to detect new delays of strongest paths in the channel. Plural trackers, one for each channel path, adjust the select assigned delays between searches performed by the searcher. A delay controller is operatively coupled to the searcher and the tracker. The delay controller compares new delays of the strongest paths from the searcher to the select assigned delays and reassigns one of the select assigned delays with one of the new delays only if the new delay differs from the one select assigned delay more than a preselect minimum amount.

It is a feature of the invention that the delay controller compares the detected delay of each of the strongest paths to each of the select assigned delays to determine nearest new delay to one of the select assigned delays. The delay controller determines if the determined nearest new delay is for the same path as the select assigned delay if the detected delay for the nearest new delay differs from the one select assigned delay less than the preselect minimum amount.

It is another feature of the invention that the delay controller reassigns the select assigned delays with a closest one of the detected new delays.

In accordance with another aspect of the invention, there is disclosed a direct sequence spread spectrum receiver for operating in a multipath fading channel including a rake receiver having plural rake fingers. Each rake finger demodulates a received signal from one of plural channel paths. The outputs of the plural rake fingers are combined. Each rake finger uses a select assigned delay to synchronize to a delay of the channel path to which it is assigned. A searcher periodically performs a channel search on the received signal to detect new delays of strongest paths in the channel. A delay controller is operatively coupled to the searcher. The delay controller compares new delays of the strongest paths from the searcher to the select assigned delays, and reassigns the select assigned delays with a closest one of the new delays.

In accordance with another aspect of the invention, there is disclosed a method of processing a received signal in a multipath fading channel comprising the steps of demodulating the received signals from each of plural channel paths utilizing a select assigned delay synchronized to a delay of one of the channel paths, periodically performing a channel search to detect new delays of strongest paths in the channel, adjusting the select assigned delays between channel searches, and comparing new delays of the strongest paths to the select assigned delays and reassigning one of the select assigned delays with one of the new delays only if the new delay differs from the one select assigned delay more than a preselect minimum amount.

There is disclosed in accordance with yet a further aspect of the invention a method of processing a received signal in a multipath fading channel, comprising the steps of demodulating the received signal from each of plural channel paths utilizing a select assigned delay to synchronize to a delay of one of the channel paths, periodically performing a channel search to detect new delays of strongest paths in the channel, and comparing new delays of the strongest paths to the select assigned delays and reassigning the select assigned delays with a closes one of the new delays.

Further features and advantages of the invention will be readily apparent from the specification and from the drawings.

BRIEF DESCRIPTION OF THE DRAWINGS

FIG. 1 is a block diagram of a direct sequence spread spectrum receiver in accordance with the invention;

FIG. 2 is a block diagram of the base band processor of FIG. 1; and

FIGS. 3A and 3B are flow diagrams illustrating a flow chart implemented in the finger location controller block of FIG. 2.

DETAILED DESCRIPTION OF THE INVENTION

Figure 3B:
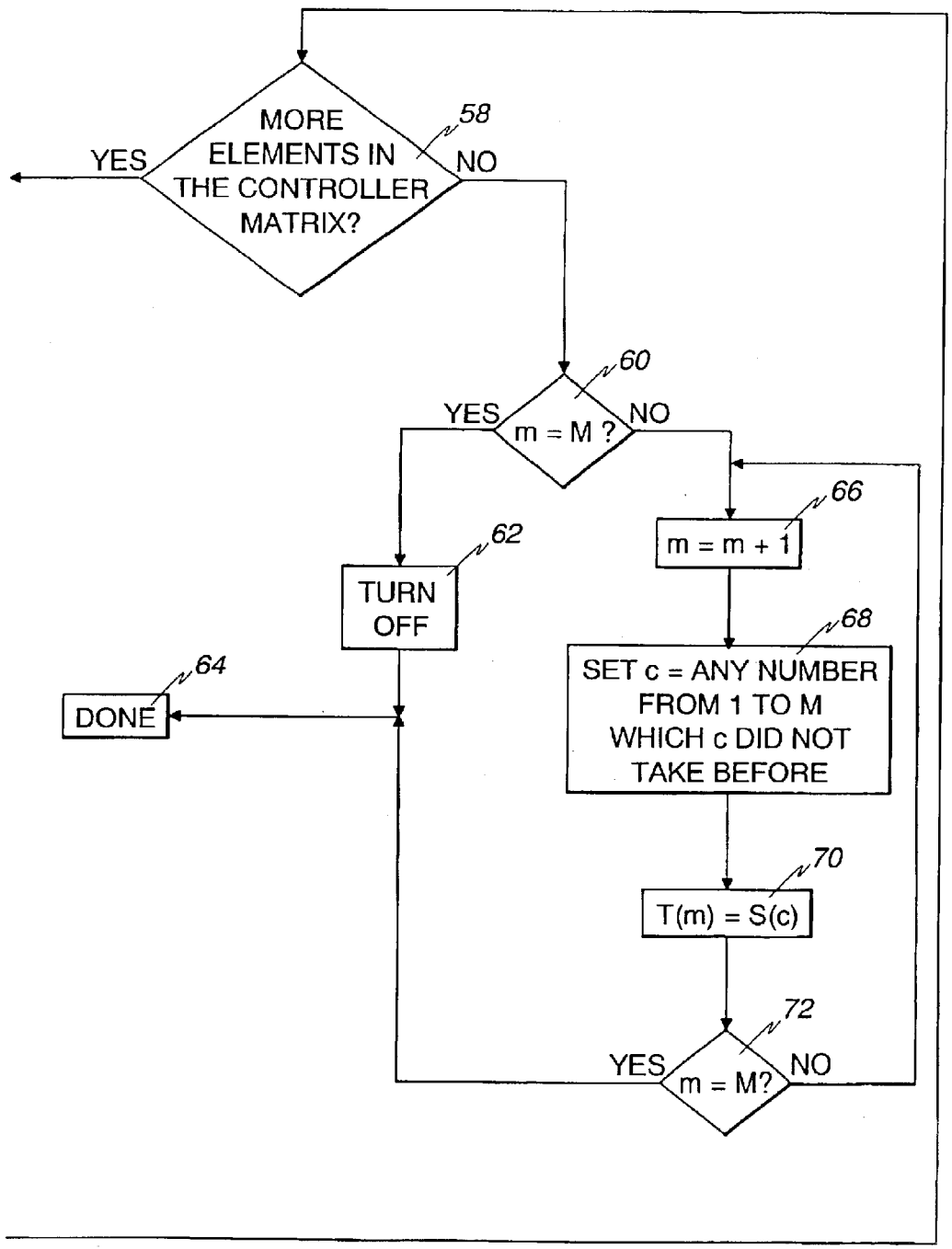

Referring to FIG. 1, a direct sequence spread spectrum (DS-SS) receiver 10 according to the invention is illustrated. The receiver 10 operates, in multipath fading channels and receives a transmitted RF signal via an antenna 12. The RF signal is down-converted from RF to baseband at a block 14 that provides a complex baseband signal on a line 16 to a baseband processor 18. Although a single antenna receiver is illustrated for simplicity, it will be appreciated that the present invention may be employed in a receiver having an array of antennas 12, and where an array of component signals is provided to the processor 18.

Referring to FIG. 2, the baseband processor 18 is illustrated in greater detail. The baseband signal on the line 16 is filtered using a matched filter 20, matched to the chip pulse waveform. This filter may be omitted if channelization filtering in the RF section 14 is sufficient. The filtered baseband signal is sampled to K samples per chip at a block 22. In one embodiment K is equal to eight. The sampled signal is applied to a rake receiver 24, delay trackers 26, and a down-sampler 28. The down-sampler 28 down-samples the signal to L samples per chip which are then provided to a delay searcher 30, where L is some integer less than K. In one embodiment, L is equal to two. The delay trackers 26 and delay searcher 30 are in turn connected to a delay controller 32, which is in turn connected to the rake receiver 24 and the delay trackers 26.

The rake receiver 24 may be of any conventional construction comprising a number of demodulation fingers, which are also known as rake fingers. Each rake finger receives and demodulates the signal component from one of a number of channel paths, known as a multipath component. The outputs of the rake fingers are then combined to develop an output signal on a line 34 representing the original transmitted signal. For a rake finger to demodulate the signal from one channel path, the finger must be able to synchronize to a delay of the path. The delay of the path represents a time duration, represented in microseconds, samples or chips, relative to a time reference. The delays of the strongest paths in the channel are detected by the delay searcher 30. Particularly, the delay searcher 30 may be of conventional construction and periodically makes a channel search and finds the delays of new strong paths in the channel. An example of a sliding correlation searcher is disclosed in U.S. Pat. No. 6,157,820, "Pilot Strength Measurement and Multipath Delay Searcher for CDMA Receiver", issued Dec. 5, 2000, and owned by the assignee of the present application, the specification of which is incorporated by reference herein. With prior DS-SS receivers the new delays were directly assigned to the rake receiver 24 to replace previously assigned delays. The delay trackers 26 are also of conventional construction. The delay trackers 26 fine tune the delay estimation of the delays assigned to the rake receiver 24. Each rake finger is associated with one tracker that updates and fine tunes the delay to the channel to which the finger is assigned between searches performed by the searcher 30.

It will be understood that the delay associated with a multipath channel is the same as the delay associated with the multipath component received over the corresponding multipath channel. Thus, the terms "path delay" and "component delay" may be used interchangeably.

In accordance with the invention, the particular delays assigned to the rake receiver 24 and fine tuned by the delay trackers 26 are determined by the finger location controller 32, rather than the searcher 30. The delay searcher 30 makes a periodic search over a wide range of channel delays, and it detects new channel path delays. Since the searcher 30 makes a search over a wide range of possible delays in the channel, to speed up the search process, and to simplify implementation, this search is performed with a reduced sampling rate, as indicated by the down-sampling to L samples per chip at the block 28. The reduced sampling rate causes the results of the delay searcher 30 to be less accurate. When the searcher 30 completes a new search, the delays that are used by the delay trackers 26 and the rake receiver 24 may be updated if stronger channel paths appear. In accordance with the invention, the delay controller 32 updates the delays being tracked and fine tuned by the trackers 26 with the delays detected by the searchers 30, such that the updating process does not cause performance degradation in the rake receiver 24.

The baseband processor 18 may consist of a programmed microprocessor or controller performing the various functions illustrated in FIG. 2. A flow chart illustrating a program implementing the function of the delay controller 32 is illustrated in FIGS. 3A and 3B. In this implementation, the finger location controller 32 utilizes a matrix for assigning new delays to the rake receiver 24. The number of rake fingers in the rake receiver 24 may be fixed or variable. Typically, the number is variable and depends principally on the number of channel paths having sufficiently strong signals to be detected. Thus, after each new channel search the number of paths found and delays assigned to the rake receiver 24 are variable.

The flow chart of FIGS. 3A and 3B assumes that after any search the delay searcher 30 found M new channel paths at delays $S(i)$, where $1 \leq i \leq M$. The operation also assumes that prior to the completion of the search the delay trackers 26 were tracking N paths at delays $T(j)$, where $1 \leq j \leq N$. In a typical embodiment, the delays S(i) and T(j) are represented in units of samples where one sample =⅛ chip period. The variables S(i) represent new detected delays found by the searcher 30. The variables T(j) represent the current delays being tracked and adjusted by the delay trackers 26.

Referring to FIG. 3A, the M delays from the searcher 30 and the N delays from the delay trackers 26 are applied to a block 40, which forms an N row by M column controller matrix. Each element in the matrix is the absolute value of S(i)−T(j). The following illustrates an example for M=4 and N=3.

|      | S(1)        | S(2)        | S(3)        | S(4)        |
|------|-------------|-------------|-------------|-------------|
| T(1) | |S(1) − T(1)| | |S(2) − T(1)| | |S(3) − T(1)| | |S(4) − T(1)| |
| T(2) | |S(1) − T(2)| | |S(2) − T(2)| | |S(3) − T(2)| | |S(4) − T(2)| |
| T(3) | |S(1) − T(3)| | |S(2) − T(3)| | |S(3) − T(3)| | |S(4) − T(3)| |

A variable m is initialized to zero at a block 42. A block 44 increments the variable m by one. A block 46 sets a variable z to be equal to the smallest element in the controller matrix formed at the block 40. The element z corresponds to the nearest new detected delay from the searcher 30 to a delay being tracked by one of the delay trackers 26. For example, if the element z is located at row number 2 and column number 3, this means that the third detected path by the searcher 30 and the second tracker path are the closest. At a block 48, a variable r is set to the row number of the smallest element determined at the block 46 and a variable c is set to the column number of the smallest element in the controller matrix determined at the block 46. A block 50 then deletes all elements in row r and all elements in column c of the controller matrix formed at the block 40. The modified matrix becomes:

|      | S(1)        | S(2)        | S(4)        |
|------|-------------|-------------|-------------|
| T(1) | |S(1) − T(1)| | |S(2) − T(1)| | |S(4) − T(1)| |
| T(3) | |S(1) − T(3)| | |S(2) − T(3)| | |S(4) − T(3)| |

As a result, if the second tracker is to be reassigned, it will be reassigned the third searcher delay. Deleting the elements at the block 50 prevents any more assignment to the second tracker or any more assignment of the third searcher to a new delay.

A decision block 52 determines if the variable z is greater than a preset parameter δ. The value δ determines the resolution to be used. A typical value for δ is on the order of 2, i.e., 0.25 chip periods. If z>δ, then this indicates that the searcher detected path, path 3 in the example, is a new path with a considerably different delay than the corresponding tracker path, path 2 in the example. If so, then at a block 54 the delay of the tracker T(r) is set equal to the searcher S(c) delay. Conversely, if z is not greater than δ, indicating that the third searcher detected path is the same path being tracked, then the delay of the tracker T(r) is not changed, as indicated in block 56. This new delay T(r) is also assigned to the corresponding finger.

From block 56 in FIG. 3A, the control proceeds via a node A to a decision block 58 in FIG. 3B, which determines if there are more elements remaining in the control matrix. If so, then control returns to block 44. The process discussed above between the blocks 44 and the block 56 is then repeated until all elements in the controller matrix are deleted. If M=N or M<N, then the paths detected by the searcher are assigned to the rake receiver 24 and the delay trackers 26 and the process is completed. Otherwise, there are additional paths to be assigned to trackers, as described more particularly below.

If no more elements are found in the controller matrix at the decision block 58, then a decision block 60 determines if m=M. If so, then the process is complete. However, in the event that the number of paths has decreased, i.e., if M<N, then there are N−M trackers that have not been confirmed with the original delay, nor are they assigned to new paths. These trackers and their corresponding rake fingers are thus turned off at a block 62 and the routine ends at a block 64. Conversely, if M>N, then there are more new paths detected by the searcher 30 than the current number of paths being tracked by the trackers 26. This occurs if m is not equal to M at the block 60. In this case, the variable m is incremented at a block 66. A block 68 sets the column number c to any number from 1 to M which c has not been assigned previously at a block 68. The tracker T(m) is then assigned the delay S(c) at a block 70. A decision block 72 then determines if m equals M. If so, then control proceeds to the block 64 and the routine ends. If not, then control returns to the block 66 to continue assigning the remaining searcher detected paths to the trackers 26 and the rake fingers.

Proceeding from block 52 to block 54 implies that the smallest element in the matrix exceeded the threshold δ. Thus, all remaining elements will also exceed δ, implying that the remaining searcher delays should be assigned to delay trackers.

It is apparent from the above description that the operation of the finger location controller minimizes the problems of loss of accuracy and unnecessary relocation of trackers discussed above. The selection of the smallest elements in the controller matrix ensures that there is no unnecessary relocation of rake fingers. The comparison with δT_c before reassigning trackers makes sure that the trackers are reassigned only when necessary. Particularly, this method identifies the pairs of search and tracker delays that are closest in delay to each other, and assigns the searcher new detected delays to trackers only if they are due to a different channel path.

DSS-SS receivers may be implemented without using delay trackers. Instead, the paths detected by the searcher are directly used by the rake finger without fine tuning. This is particularly done when the searcher hardware allows it to work with a large number of samples per chip. In such a receiver design, the loss of accuracy problem discussed above does not exist. Even when the searcher has good resolution (sufficient number of samples per chip), delay trackers may still be used, to allow delay estimates to be refined between searcher updates. Thus, the baseband processor 18 in accordance with the invention can still be used to eliminate the problem of unnecessary relocation of fingers.

While the present invention has been described with regards to a rake receiver employing a plurality of fingers, the invention can be used with other forms of rake reception. For example, the rake receiver can be implemented as a sliding correlator followed by a tapped delay line. The sliding correlator produces despread values corresponding to successive delay values. These despread values are then stored in the tapped delay line. A rake finger would correspond to a position on the tapped delay line, which would be tapped off for use in rake combining.

A key aspect of the present invention is that fingers assigned to existing channel paths are not reassigned, disrupting the demodulation process. This implies not only preserving the delay estimate from the delay tracker, but also preserving other demodulation information for that finger, such as a channel coefficient estimate and possible automatic frequency correction (AFC) estimates. With traditional rake combining, the despread value is multiplied by the conjugate of the corresponding channel coefficient. Channel coefficients can be estimated using a pilot channel, pilot symbols, and/or decision feedback. Also, AFC estimates such as a frequency error estimate and/or phase estimate may be needed to account for local oscillator imperfections of a Doppler shift in the channel path. Channel estimation and AFC are discussed in more detail in U.S. Pat. No. 6,134,260, "Method and Apparatus for Frequency Acquisition and Tracking for DS-SS CDMA Receivers", issued Oct. 17, 2000, owned by the assignee of the present application, the specification of which is incorporated by reference herein. Thus, in FIG. 3 A, block 56, not only is the delay estimate preserved, but the other estimates associated with the finger are also preserved.

When fingers are reassigned, which occurs in block 54 of FIG. 3A, channel and AFC estimates must be re-initialized. The simplest solution is to set the channel coefficient to zero and the AFC phase and frequency error estimates to zero. However, there will be a delay before these estimates become accurate, delaying the usefulness of the newly assigned finger. To reduce this delay, in accordance with the present invention, the estimates are initialized to nonzero values. For channel estimation, the channel coefficient is initialized to a first measured value, possibly scaled down to account for the measured value being noisy. For example, in a system with a pilot channel such as IS-95, the first correlation to the pilot channel can be used to initialize the channel coefficient.

For AFC, if present, the frequency error estimate can be initialized to an existing estimate from another finger, for example the strongest, or from some composite frequency error estimate based on multiple fingers. If AFC employs a phase-locked loop, then the phase can be initialized to the phase of a first measured channel coefficient value. For example, in a system with a pilot channel such as IS-95, the phase of the first correlation to the pilot channel can be used to initialize the phase estimate. Thus, in general, demodulation information from a first set of channel paths (e.g., existing fingers) can be used to initialize demodulation information from a second set of channel paths (e.g., new fingers). Each set may contain one or more elements.

Initialization of fingers also occurs when the receiver is first turned on. For this case, initialization based on the first, or a set of first measurements can also be used. For AFC, the frequency error estimate can be initialized to a value obtained from some initial coarse frequency error estimation or initialized to zero.

As will be appreciated by one of skill in the art, the present invention may be embodied as methods or devices. Accordingly, the present invention may take the form of an entirely hardware embodiment, an entirely software embodiment, or an embodiment combining software and hardware aspects.

The present invention has been described in part with respect to FIGS. 3A and 3B which illustrate a flowchart illustration of an embodiment of the present invention. It will be understood that each block of the flowchart illustration, and combinations of blocks in the flowchart illustration, can be implemented by computer program instructions. These program instructions, which represent steps, may be provided to a processor to produce a machine.

Accordingly, blocks of the flowchart illustration support combination of means for performing the specified functions and combinations of steps for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Thus, in accordance with the invention there is disclosed a direct sequence spread spectrum receiver that provides delay searcher and delay tracker interaction for new delay assignments to rake fingers.

We claim:

1. In a RAKE receiver having at least two RAKE fingers, a method of reinitializing a selected RAKE finger for demodulation of a symbol sequence, said method comprising using demodulation information for a first RAKE finger to Initialize demodulation information for a second RAKE finger after said second RAKE finger is assigned a new delay.

2. The method of claim 1 wherein using said demodulation information for said first RAKE finger to initialize demodulation information for said second RAKE finger after said second RAKE finger is assigned said new delay comprises initializing said second RAKE finger with a channel estimate used by said first RAKE finger.

3. The method of claim 1 Wherein using said demodulation information for said first RAKE finger to initialize demodulation information for said second RAKE finger after said second RAKE finger is assigned said new delay comprises initializing said second RAKE finger with a phase estimate used by said first RAKE finger.

4. A method for using a RAKE receiver having one or more RAKE fingers to demodulate a received signal:

assigning a first delay to a first RAKE finger, demodulating said received signal with said first RAKE finger based on said first delay;

reassigning said first RAKE finger with a second delay;

reinitializing demodulation information used by said first RAKE finger after reassigning said first RAKE finger with said second delay.

5. The method of claim 4 wherein reinitializing demodulation information used by said first RAKE finger after reassigning said first RAKE finger with said second delay comprises initializing a channel estimate used by said first RAKE finger to demodulate said received signal.

6. The method of claim 5 wherein initializing said channel estimate used by first RAKE finger to demodulate said received signal comprises using a first correlation to a pilot channel as the initialized channel estimate.

7. The method of claim 5 wherein initializing said channel estimate used by said first RAKE finger to demodulate said received signal comprises initializing said first RAKE finger with a channel estimate used by a second RAKE finger.

8. The method of claim 4 wherein reinitializing demodulation information used by said first RAKE finger after reassigning said first RAKE finger with said second delay comprises initializing a phase estimate used by said first RAKE finger to demodulate said received signal.

9. The method of claim 8 wherein initializing said phase estimate used by said first RAKE finger to demodulate said received signal comprises using a phase of a first correlation to a pilot channel as the initialized phase estimate.

10. The method of claim 8 wherein initializing said phase estimate used by said first RAKE finger to demodulate said received signal comprises initializing said first RAKE finger with a phase estimate used by a second RAKE finger.

* * * * *